(12) United States Patent
Saraf et al.

(10) Patent No.: US 6,562,081 B2
(45) Date of Patent: May 13, 2003

(54) DISPERSE DYED POLYETHYLENE AND PROCESS

(75) Inventors: Anil W. Saraf, Mason, OH (US); Michael Bridges, Cincinnati, OH (US); Venki Chandrashekar, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 86 days.

(21) Appl. No.: 09/818,004

(22) Filed: Mar. 27, 2001

(65) Prior Publication Data

US 2003/0019054 A1 Jan. 30, 2003

(51) Int. Cl.⁷ .................................................. D06P 3/79
(52) U.S. Cl. ....................... 8/529; 8/513; 8/638; 8/639; 8/643
(58) Field of Search ............................ 8/529, 928, 638, 8/639, 643, 513, 400

(56) References Cited

U.S. PATENT DOCUMENTS

| | | | |
|---|---|---|---|
| 3,081,519 A | 3/1963 | Blades et al. | |
| 3,361,843 A | 1/1968 | Miller et al. | |
| 3,395,198 A | 7/1968 | Taniguchi et al. | |
| 3,653,803 A | 4/1972 | Hammer | |
| 5,017,658 A | 5/1991 | Noma et al. | |
| 5,468,259 A | 11/1995 | Sheth et al. | |
| 5,550,192 A | 8/1996 | Sheth et al. | |
| 5,576,366 A | 11/1996 | Sheth | |
| 5,846,654 A | 12/1998 | Modrak | |
| 6,039,767 A | * 3/2000 | Boyes et al. | |
| 6,054,215 A | 4/2000 | Son et al. | |

OTHER PUBLICATIONS

Needles, Howard L.: *Textile Fibers, Dyes, Finishes, and Processes: A Concise Guide*: Chapter 17: p. 191. Noyes Publications (1986).

* cited by examiner

Primary Examiner—Margaret Einsmann
(74) Attorney, Agent, or Firm—Gerald A. Baracka; William A. Heidrich

(57) ABSTRACT

Disperse dyed polyethylene fibers obtained by either melt spinning or flash spinning and materials produced from said fibers are provided. The process utilizes dye blends containing at least three and, more preferably, four or more disperse dyes selected from a primary color group. The individual dyes are utilized at a concentration of at lest 75% but less than 100% of the determined maximum concentration which produces crocking. HDPE and LLDPE materials are effectively dyed using disperse dye blends formulated by the invention.

15 Claims, No Drawings

DISPERSE DYED POLYETHYLENE AND PROCESS

BACKGROUND OF THE INVENTION

1. Field of the Invention

This invention relates to disperse dyed polyethylene fibers and dye blends used for their manufacture. More specifically, the invention relates to disperse dyed articles and especially disperse materials produced from flash spun plexifilaments. Processes for producing the disperse dyed polyethylenes and dye blends are also disclosed.

2. Description of the Prior Art

The inability to dye polyolefin fibers is well known and has been a long standing problem within the industry. Polyolefins are hydrophobic and they lack dye sites to which dye molecules may become attached. One approach to color polyolefin fibers has been to add colored inorganic salts or stable organometallic pigments to polymer melts prior to spinning. Nonvolatile acids or bases or materials such as polyethylene oxides or metal salts have also been added to polymers prior to fiber formation to increase the affinity of the fiber for disperse, cationic, acid or mordant dyes. Still another approach has been to chemically graft polyolefin fibers with appropriate monomers after fiber formation to improve dyeability. See *Textile Fibers, Dyes, Finishes, and Processes: A Concise Guide,* by Howard L. Needles, Noyes Publications, 1986, page 191.

Efforts to impart dyeability to polyolefins, and particularly polypropylene, by incorporating nitrogen-based polymer additives has also been disclosed. In U.S. Pat. No. 3,361,843 various incompatible, basic nitrogen-based polymers are added to polypropylene, given a treatment with high concentrations of certain acidic chemical reagents and then dyed in an acid dye bath. According to U.S. Pat. No. 3,653,803 dyeing of the polypropylene fiber is somewhat improved by the method of U.S. Pat. No. 3,361,843, but processing of the fiber is difficult due to the incompatible polymer, the dye fastness properties are not reliably reproducible and tinctorial strengths are not commercially sufficient. In U.S. Pat. Nos. 3,395,198 and 3,653,803, various compatible nitrogen-containing copolymers of ethylene and an aminoalkyl acrylate compound are disclosed which, when blended with polyolefins, render fibers formed from the blend acid dyeable. In U.S. Pat. No. 5,017,658 a fiber finishing agent is used in melt spinning dyeable polypropylene fibers obtained by blending a copolymer of an ethylene aminoalkyl acrylate with polypropylene.

Since polypropylene (PP) has properties rendering it highly useful for the manufacture of carpeting, still other efforts have been devoted to developing dyeable PP based fibers by modifying by the addition of functionalized copolymers capable of introducing polar sites with which dyes can associate. Such "modified" polyolefins are disclosed in U.S. Pat. Nos. 5,468,259 and 5,550,192 wherein PP is combined with an ethylene-alkyl acrylate copolymer to provide 0.2 to 2.0 percent by weight alkyl acrylate in the fiber thus rendering the composition disperse dyeable under atmospheric pressure and conventional dyeing temperature conditions. A related procedure disclosed in U.S. Pat. No. 5,576,366 incorporates 0.1 to 15 percent by weight polyester with the ethylene-alkyl acrylate copolymer or other polar group-containing material. A method of disperse dyeing PP fibers of the above types which contain functional groups as a result of incorporating other polymers with the PP utilizing disperse dye mixtures is also disclosed in U.S. Pat. No. 6,039,767.

In a process disclosed in U.S. Pat. No. 6,054,215, disperse dyeable PP fibers are produced by making PP resin composition chips by dispersing 100 parts by weight of PP, 1–10 parts by weight of semi-crystalline functional high polymer, 0.05–5 parts by weight of amorphous functional polymer, and 0.1–3 parts by weight additives and melting and spinning the PP resin composition chips.

Procedures to effectively dye unmodified polyolefins, i.e., polyolefins having no added polar functionality, are needed. It would be particularly advantageous if disperse dyed polyethylene fibers and materials were available.

SUMMARY OF THE INVENTION

The present invention relates to disperse dyed polyolefins, particularly polyethylene (PE), to disperse dye mixtures and to a method of disperse dyeing. A significant feature of the invention is that polyethylene materials may be reliably disperse dyed to various shades and that the dyed materials exhibit good crocking characteristics. The polyethylene may be dyed as the fiber, yarn or fabric. Another significant advantage of the invention is that the dyeing is accomplished using conventional dyeing procedures and that the dye blends are obtained using combinations of commercially available disperse dyes. A further significant feature is that the disperse dye mixtures used are formulated utilizing known dye selection procedures.

More specifically, the invention relates to a process for disperse dyeing polyethylene based material comprising preparing a primary color dye blend comprising a plurality of disperse dyes from said primary color group, each of the selected plurality of disperse dyes present within the dye blend at a concentration of at least 75 percent but less than 100 percent of its determined maximum concentration which will produce crocking, and contacting the undyed polyethylene material with the disperse dye blend to dye the material.

The polyethylene is preferably a polyethylene homopolymer or copolymer of ethylene and a $C_{3-8}$ α-olefin having a melt index from 0.05 g/10 min to 50 g/10 min and density from 0.910 g/cm³ to 0.965 g/cm³. The process is particularly useful for disperse dyeing HDPE and LLDPE fibers and woven and nonwoven materials produced therefrom. The fibers may be obtained by either melt spinning or flash spinning processes; however, nonwoven materials from plexifilimentary polyethylene fibers produced in flash spinning operations particularly benefit when dyed with the disperse dye blends of the invention. Useful blue, red and yellow disperse dye blends are detailed hereafter.

DETAILED DESCRIPTION

Polyethylene resins useful for the formation of fibers and which are effectively dyed in accordance with the invention are homopolymers of ethylene and copolymers of ethylene with other olefinic hydrocarbon monomers such as propylene, butene-1, hexene-1, 4-methylpentene-1 and diolefins (e.g., 1,3-butadiene, 1,4-hexadiene, 1,5-hexadiene). Copolymer resins will have ethylene as the major constituent. The PE resins contain no functionality, i.e., they are not modified by copolymerizing or grafting functional monomers or by blending with resins containing functionality. As used herein, the term PE refers to both homopolymers and copolymers of ethylene.

Polyethylene homopolymers and copolymers of ethylene with $C_{3-8}$ α-olefins are most advantageously employed in view of the useful properties of the fibers produced therefrom. These resins have a high degree of linearity generally considered to be advantageous for the production of fibers. The resins will generally have melt indexes (MIs) determined in accordance with ASTM D 1248 at 190° C. from about 0.05 to 50 g/10 min and, more preferably, from about 0.1 to about 30 g/10 min. The MI of the polyethylene resin used will depend on the type of operation used to spin the fiber, the type of fiber being produced and the fiber properties desired.

Densities of the polyethylene resins can range from 0.910 to 0.965 g/cm$^3$. This range of densities typically encompasses what are referred to as low density, medium density and high density resins. High density polyethylene (HDPE) and linear low density polyethylene (LLDPE) resins typically having densities from 0.941 to 0.965 g/cm$^3$ and 0.915 to 0.925 g/cm$^3$, respectively, are particularly advantageous for the invention.

Polyethylene homopolymers of moderate molecular weight distribution having densities from about 0.955 to 0.962 g/cm$^3$ are especially useful for the production of disperse dyed nonwoven plexifilament materials. Densities are determined in accordance with ASTM D 1505.

Processes for producing fibers from a melt, i.e., melt spinning, or from a spin solution, i.e., flash spinning, are known and fibers produced by any of these known processes are suitably dyed in accordance with the present procedure. Conventional processes for forming fibers from a melt involve extrusion of the polymer in the melt state from a spinnerette followed by drawing in a one-step operation or in a second step. Various process modifications are possible to vary the melt-spun fiber characteristics. For example, an additional hot air drawing zone is employed in systems designed for high tenacity fiber production. In general, melt spinning operations are carried out at temperatures as high as 290° C. and, more preferably from 210° C. to 250° C. Temperatures much above these limits have little advantage and, in fact, can be detrimental due to excessive degradation of the resin. As is recognized by those skilled in the art, processing temperature and pressure as well as the size and shape of the spinnerette holes, spinning speed and draw ratio are selected to minimize melt fracture and optimize fiber properties. A detailed description of procedures used to melt spin fibers is provided in U.S. Pat. No. 5,846,654, the disclosure of which is incorporated herein by reference.

For melt spinning PE fibers for textile applications, resins having MIs less than 40 g/10 min and, more preferably, from about 10 to 30 g/10 min are most useful when producing fine denier fibers of about 6 denier per filament (dpf) or less for textile and apparel applications. The yarn so produced can be processed further into a fabric form using several of the available conversion technologies such as knitting, weaving or nonwoven processes. These yarns can also be used in combination with other dyeable natural or synthetic fibers such as cotton, polyester, nylon and wool.

Flash spinning procedures, wherein polymer solutions maintained at temperatures above the boiling point of the solvent are extruded into a letdown zone causing solid polymer fibrillated materials to be formed as the solvent is vaporized, are also known. Such a process is described in U.S. Pat. No. 3,081,519 which is incorporated herein by reference. The resulting multi-fibrous yarn-like strands consisting of a plurality of essentially longitudinally extended, interconnected, random-length fibrous elements are referred to as film-fibrils or plexifilamentary film-fibril materials. Nonwoven sheet products produced from PE plexifilaments produced in the above manner are sold under the trademark TYVEK. Products produced from these sheets have a paper-like feel and have been used for envelopes and other packaging applications as well as for construction barrier materials.

PE fibers produced using a solution based approach, i.e., processes which involve "flashing off" of the solvent during spinning, typically use high molecular weight polyethylenes with MIs in the range of 0.05 to 10 gm/10 min and, more preferably, in the range of 0.2 to 5 gm/10 min. HDPE resins are preferred. Fibers produced in this manner are finer and stronger than obtained by melt spinning procedures and are useful to produce dense nonwoven materials having a softer feel.

Conventional polyolefin stabilizers are included to protect the polyethylene against thermal degradation during the melt spinning or flash spinning operation. Conventional nucleating agents may also be included and, depending on the end use application, one or more stabilizers to protect the resulting fiber against oxidative and ultraviolet degradation may be present. These additives will generally be present in amounts not exceeding 2 weight percent and, more typically, in amounts from about 0.01 to about 0.5 weight percent. All weight percentages specified herein are based on the total weight of the polyethylene unless otherwise specified.

The polyethylene resins, which are not modified by the addition of any functionalized polymer or by incorporating any functionalized compounds or monomers, are disperse dyed utilizing a plurality of selected dye components, referred to herein as a dye mix or dye blend. Disperse dyes included in the dye mix are selected utilizing the process of U.S. Pat. No. 6,039,767, which is incorporated herein by reference, wherein each dye is selected by testing individual dye solutions and determining the maximum dye concentration that will produce an acceptable crocking result for that dye. Various disperse dyes, each at a concentration of at least 75 percent of the maximum dye concentration of each individual dye, are then blended to provide dye mixes which surprisingly are capable of effectively dyeing polyethylene fibers, yarns and woven and nonwoven fabrics. Optimal dye blends may thus be created by the above technique for each of the primary color groups, i.e., red, yellow and blue. These optimal dye blends may then be combined in the appropriate ratios to produce the desired color and shade of the dyed polyethylene.

Typically at least three dyes within each primary color group are employed for that primary color dye blend; however, best results are obtained using four or more disperse dyes for the blends. Surprisingly, it has been found advantageous from the standpoint of developing darker and more intense colors and acceptable fastness to utilize more dyes at individual concentrations well below each dyes saturation limit than to use fewer dyes at or near their individual saturation limits. While the mechanism for this phenomenon is not understood, the results are unequivocal.

Individual dyes included in the dye blends are selected based on their contribution to the dye blend. Some dyes build better than others and will be selected for this aspect whereas other dyes have good fastness properties. When developing the dye blends, the individual dyes used will be selected to compliment each other and optimize performance of the resulting dye blend. For example, in constructing a blue dye blend, blue 87 and Terasil blue HLB have very good light fastness, but blue 87 does not build well. Blue HLB builds better but not as well disperse blue 148. This blue has very acceptable light fastness at concentration levels as low as 0.05%. A combination of these three dyes results in a mix with excellent all around buildup and fastness properties. One can now add to this mix blue 291, which is a very good builder, but has mediocre light fastness. A small or moderate amount of blue 291 gives additional boost to the buildup properties of this four-dye mix, while still maintaining an adequate light fastness. This process can be expanded with the addition of other blue dyes. Each component contributes to achieving an adequate buildup and acceptable fastness of the disperse dyed polyethylene materials.

The amount of dye blend used in the dye bath, i.e., the sum of all of the individual dyes which comprise the dye mix, will typically be above 0.5 weight. Most commonly, the dye blends constitute from 0.1 to 7 percent of the dye bath solution. In an especially useful embodiment of the invention, the concentration of the dye blend in the dye bath solution is from 0.5 to 5 weight percent. In each case, the sum of the dye concentrations for the individual dyes in the dye mix will be substantially greater than the determined maximum dye concentration for each of the individual dyes within the dye mix.

Known disperse dyes within each of the primary color groups may be utilized to obtain dye blends useful for the invention.

| Primary Color Red, including Scarlets, Bordeaux, and Violets | |
|---|---|
| Disperse Red 60 | (Intrasil Brilliant Red 2B 200%) |
| Disperse Red 50 | (Intrasil Scarlet 2GH) |
| Disperse Red 146 | (Intrasil Red BSE) |
| Disperse Red 127 | (Dianix Red BSE) |
| Dianix Red ACE | |
| Disperse Red 65 | (Intrasil Red MG) |
| Disperse Red 86 | (Terasil Pink 2 GLA) |
| Disperse Red 191 | (Intrasil Pink SRL) |
| Disperse Red 338 | (Intrasil Red 4BY) |
| Disperse Red 302 | (Terasil Pink 3G) |
| Disperse Red 13 | (Intrasperse Bordeaux BA) |
| Disperse Red 167 | (Foron Rubine S-2GFL) |
| Disperse Violet 26 | (Intrasil Violet FRL) |
| Primary Color Blue | |
| Disperse Blue 60 | (Terasil Blue BGE 200%) |
| Disperse Blue 291 | (Intrasil Blue MGS) |
| Disperse Blue 118 | (Terasil Blue GBT) |
| Terasil Blue HLB | |
| Dianix Blue ACE | |
| Disperse Blue 87 | (Intrasil Blue FGB) |
| Disperse Blue 148 | (Palnnil Dark blue 3RT) |
| Disperse Blue 56 | (Intrasil Blue FBL) |
| Disperse Blue 332 | (Bafixan Turquoise 2 BL liq.) |
| Primary Color Yellow, including Orange, Yellow Brown | |
| Disperse Yellow 64 | (Disperite Yellow 3G 200%) |
| Disperse Yellow 23 | (Intrasil Yellow 5R) |
| Palanil Yellow HM | |
| Disperse Brown 19 | (Disperol Yellow D-7G) |
| Disperse Orange 30 | (Foron Yellow Brown S-2RFL) |
| Disperse Orange 41 | (Intrasil Orange 4RL) |
| Disperse Orange 37 | (Intrasil Dark Orange 3GH) |
| Disperse Yellow 3 | |
| Disperse Orange 30 | |
| Disperse Yellow 42 | |
| Disperse Orange 89 | |
| Disperse Yellow 235 | |
| Disperse Orange 3 | |
| Disperse Yellow 54 | |
| Disperse Yellow 233 | (Foron Yellow S-6GL) |

The above disperse dye designations are sometimes abbreviated. For example, disperse red 60 would be R 60, disperse blue 60 would be B 60, and the like.

Dye blends from each of the primary color groups can be formulated using disperse dyes selected from the above list in accordance with the procedure of U.S. Pat. No. 6,039,767.

Highly useful blue dye blends have the following composition:

| | |
|---|---|
| B 60 | 4.5–6% |
| B 87 | 6–8% |
| B 148 | 26–35% |
| B 291 | 22.5–30% |
| Terasil Blue HLB | 22.5–30% |

A preferred blue dye blend (I) for dyeing polyethylene in accordance with the invention comprises 5% B 60, 6% B 87, 30% B 148, 25% B 291, 24% Terasil Blue HLB and 10% Crisotan NR.

Percentages in the above formulations as well as all the formulations set forth herein are weight percentages based on the total weight of the formulation. When preparing dye solutions of the above blue dye blend or other dye blends of the invention, the individual dyes may be separately added to the dye bath or, as is more typically the case, the dye components can be dry blended in the appropriate ratios and this mixture added to the dye bath in the desired concentration. As will be appreciated by those skilled in the art, blends of less than all the disperse dye components can also be prepared and combined with the other dye components in the dye bath. When the dye components are dry blended, it may be advantageous to utilize a dispersing agent to facilitate the blending operation. Known dispersing agents, such as Crisotan NR, may be used for this purpose. Typically, from 5–15 weight percent dispersing agent, based on the total weight of the blend will be employed.

In one highly useful embodiment of the invention red dye blends have the composition:

| | |
|---|---|
| R 60 | 7.5–10% |
| R 50 | 12–16% |
| R 13 | 7.5–10% |
| R 127 | 7.5–10% |
| R 146 | 30–40% |
| R 302 | 7.5–10% |
| R 65 | 3.75–5% |
| R 86 | 3.75–5% |

A preferred red dye blend (II) of the above type comprises 8% R 60, 14% R 50, 8% R 13, 8.5% R 127, 36.5% R 146, 8% R 302, 4% R 65, 4% R 86 and 10% Crisotan NR.

Other highly advantageous red dye blends for disperse dyeing unmodified polyolefins in accordance with the invention have the composition:

| | |
|---|---|
| R 50 | 12–16% |
| R 127 | 9–12% |
| R 146 | 37.5–50% |
| R 302 | 7.5–10% |
| R 338 | 7.5–10% |
| R 167 | 7.5–10% |

A preferred red dye blend of the above type comprises 14% R 50, 10% R 127, 45% R 146, 8% R 302, 8% R 338, 8% R 167 and 7% Crisotan NR.

Useful yellow dye blends will have the following composition:

| | |
|---|---|
| Y 64 | 22.5–30% |
| Y 23 | 22.5–30% |
| Brn 19 | 22.5–30% |
| Or 37 | 6–8% |

A preferred yellow dye blend in accordance with the above formula comprises 28% Y 64, 28% Y 23, 28% Brn 19, 7% Or 37 and 9% Crisotan NR.

Woven and nonwoven polyethylene fabrics may be dyed or printed using these dye blends employing any of the commercial processes available to the industry. Most commonly used processes for dyeing fabrics are the continuous and batch processes each of which involves immersing the fabric in a dyebath for 15 to 45 minutes. The dyebath would typically be made up of the desired amount of dye blend in water along with an exhausting agent, a buffer solution to maintain an acidic pH and a leveling agent. Dyeing may be conducted in an open beck at or near boiling temperatures or in closed pressure vessels. High pressure dyeing is commonly practiced for dyeing polyester yarn on spools; however, in case of polyethylene the pressure and temperature could be significantly lower.

The dyed fabric may be subsequently washed and scoured in the next step and dried. In addition, the fabric may be finished with other chemical treatments to render specific properties to the fabric to suit its end use application. These could be topical agents to enhance the feel or impart flame retardancy or soil resistance, etc. Adequate precautions should be taken to ensure that such topical treatments do not interfere with the fastness properties of the dyes.

These dye blends could also be utilized for printing of dyed or undyed fabrics. A printing paste may be made by blending the dyes along with appropriate quantities of adhesives such as guar gum or synthetic gum to ensure the right viscosity of the paste for deposition and penetration inside the fabric. Additionally, compatibilizers, buffer solutions and UV stabilizers may be added to enhance the performance of the print. Screen printing processes or roller printing processes may be employed to deposit the paste on the fabric per the design of the pattern. The fabric may be dried using dry heat in an oven maintained between 100° C. to 200° C. Alternatively, or additionally, in a subsequent step, the fabric may be treated with saturated steam to ensure greater penetration of the print through the fabric. The fabric then may be scoured, chemically treated with special finishes and ultimately dried.

To demonstrate the ability to effectively dye polyolefin materials using these disperse dye blends, 1% and 4% solutions were prepared by adding the dye blend to 250 mls room temperature distilled water and stirring until all of the powder was dissolved. Additional distilled water was added to bring the total volume of the dye solution to 500 ml. The pH of the solution was then adjusted to 4.5 by the addition of acetic acid.

For the dyeing, 2 gram swatches of material were employed so that the liquor to fabric ratio was 250:1. The fabric and dye solution were put in a stainless steel jar which was sealed and placed in an infrared-heated color oven programmed to rotate the jars at 15 rpm. The direction of rotation was changed periodically. The oven was programmed to heat the container and its contents to 80° C. at a rate of 2° C. per minute. After a 30 minute soak at 80° C., the oven was cooled to 60° C. at a rate of 3° C. per minute and the samples allowed to soak at 60° C. for another 30 minutes. The dyed fabric samples were then removed from the containers, rinsed in cool water until the rinse water was clear, and drip-dried. Dyed samples were evaluated visually and spectrophotometrically for depth of color. Spectrophotometric testing on the dyed fabric was carried out in accordance with the CIELAB procedure (Illuminant D65 10 Degree). The dried fabric samples were also evaluated for crock fastness in accordance with AATCC test method 8-1996.

Transmission (TR) values and absorption values (AU) of the dye bath liquor recovered after dyeing was also determined using a Palm-Spec Model S 2000 spectrophotometer. With this configuration 2048 wavelengths are displayed simultaneously over the 370–950 nm range. The light source was a long life tungsten bulk with multiple violet light emitting diodes. The spectrophotometer stores a reference with the light source on a blank sample. Then a dark reference is taken with the light turned off. After the sample is placed into the testing chamber, absorbance (AU) is calculated as:

$$AU = -log10(S-D)(R-D)$$

and percent transmission (TR) is calculated as:

$$TR + (S-D)/(R-D) \times 100$$

Where S=sample intensity at wavelength, D=dark intensity at wavelength and R=reference intensity at wavelength.

A sample of a standard Tyvek nonwoven material (48 g/sq. yard) produced by flash spinning HDPE (MI 0.7 g/10 min; density 0.960 g/cm$^3$) was dyed in accordance with the above procedure using 1% of dye blend II. To illustrate the superior results obtained using the dye blends of the invention. For comparison, the same Tyvek material was also dyed using 1% Dianix Red ACE, a highly effective disperse red dye for dyeing PET. The dyed samples obtained using dye blend of the invention had significantly better depth of color upon visual inspection than the samples dyed with the Dianix dye at the same concentration. Spectrophotometric test results set forth in Table 1 verify the improvement obtained with the dye blends of the invention.

TABLE 1

Comparison of Dyeing Results with Flash Spun Nonwoven Polyethylene Fabric Using Dye Blend II and Dianix Red ACE

| | 1% Dye Blend II | 1% Dianix Red ACE |
|---|---|---|
| L* | 77.4 | 91.4 |
| a* | 31.0 | 13.7 |
| b* | 2.94 | -1.46 |
| TR (%) | 77 | 76 |
| AU | 0.11 | 0.19 |

The higher a* value obtained with the fabric dyed using dye blend II confirms the improved depth of color of the dyed material. In general, a* value differences of about 3 will not be discernible to the untrained eye; however, a Δa* of 17.3 obtained with the blended dye compared to the comparative indicates a significantly deeper color with the nonwoven fabric dyed with the dye blend of the invention. Differences in a* values of this magnitude are readily apparent to the naked eye of even the most unskilled layperson. Similarly, the lower AU value obtained for the dye bath containing dye blend II indicates less dye remaining in the dye bath solution after dyeing. Both dyed samples had acceptable crock fastness.

Similar improvement was observed when Tyvek samples were dyed using 4% dye solutions of dye Blend II and Dianix Red ACE. A much deeper and richer red color was obtained with the dye blend of the invention. This was confirmed spectrophotometrically. Whereas for the nonwoven polyethylene Tyvek sample dyed using dye blend II was 61.78, the a* value for the sample dyed using the same concentration of Dianix Red ACE was only 12.43.

A knit polyethylene fabric was also dyed using red dye Blend II and, form comparison, Dianix Red ACE. The polyethylene fibers were provided from HDPE having an MI of 20 and density of 0.955 g/cc. The fibers were produced using a Hills PFL1 fiber spinning machine. The polymer was extruded from a single screw extruder with a ramped-up temperature profile ranging from 220° C. to 245° C. The polymer melt was maintained at a temperature of 190° C. and a 136 filament yarn was spun at a first godet speed of 1000 m/min. To optimize processability during fiber manufacture a 1% spin finish was applied. The yarn was drawn at a draw ratio of 3:1. The drawn yarn was knitted in the form of a sock on a circular knitting machine.

Whereas essentially no color difference was apparent with the knit fabrics dyed using low dye bath concentrations, the dye blend of the invention still achieves a richer shade of red at the higher (4%) dye bath concentrations. Results obtained upon spectrophotometric analysis of the dye fabrics are set forth in Table 2. The lower a* values obtained for the fabric dyed with dye Blend II of the invention at the 4% dye level, confirms the improved results obtained.

TABLE 2

Comparison of Dyeing Results with Knit Polyethylene Fabric at 1% and 4% Dye Bath Concentrations using Dye Blend II and Dianix Red ACE

| | 1% Dye in Dye Bath | | 4% Dye in Dye Bath | |
| --- | --- | --- | --- | --- |
| | Dye Blend II | Dianix Red ACE | Dye Blend II | Dianix Red ACE |
| L* | 55.5 | 57.4 | 44.67 | 54.97 |
| a* | 44.5 | 46.6 | 49.67 | 41.86 |
| b* | 9.62 | 2.27 | 18.13 | 1.89 |
| TR (%) | 76 | 69 | 34 | 45 |
| AU | 0.13 | 0.16 | 0.76 | 0.77 |

While the raw a* data obtained for the knit polyethylene fabric indicates a deeper shade of red for the knits versus the nonwoven, the difference in a* values is attributable to the fact that the knits are produced using higher denier fibers (3 dpf; ~20 microns) compared to the nonwoven material wherein the flash spun fibers range from 1–10 microns.

Nonwoven and knit polyethylene fabrics were also dyed using a blue dye blend obtained in accordance with the procedure of U.S. Pat. No. 6,039,767. The fabrics used were the same as described above and the disperse dye blend was blue dye blend I. Dye bath solutions containing 1% and 4% of the dye blends were used following the above-described procedures. For comparison, the nonwoven and woven materials were also dyed using 1% and 4% dye solutions prepared using a single well-known disperse blue dye, Dianix Blue ACE. Spectrophotometric test results on the dyed samples are set forth in Table 3.

Not only did the fabric samples dyed using the blue dye blend of the invention have a deeper, richer color to the naked eye, the spectrophotometric results obtained for b* clearly support the improved depth of shade. The lower negative b* values obtained with the dye blends of the invention confirm the darker blue shades.

TABLE 3

Comparison of Dyeing Results with Nonwoven and Knit Polyethylene Fabric at 1% and 4% Dye Bath Concentrations using Blue Dye Blend I and Dianix Blue ACE

| | 1% Dye in Bath | | | | 4% Dye in Bath | | | |
| --- | --- | --- | --- | --- | --- | --- | --- | --- |
| | Nonwoven | | Knit | | Nonwoven | | Knit | |
| | Dye Blend I | Dianix | Dye Blend I | Dianix | Dye Blend I | Dianix | Dye Blend I | Dianix |
| L* | 77.96 | 88.37 | 38.91 | 53.5 | 65.74 | 86.38 | 31.6 | 46.27 |
| a* | 0.73 | −1.67 | 4.41 | 3.91 | −0.23 | 0.84 | 6.03 | 6.19 |
| b* | −22.4 | −12.12 | −35.32 | −26.31 | −32.55 | −13.72 | −34.88 | −27.12 |
| TR(%) | 90 | 75 | 78 | 70 | 74 | 28 | 47 | 28 |
| AU | 0.04 | 0.13 | 0.11 | 0.15 | 0.10 | 0.55 | 0.33 | 0.56 |

We claim:

1. A process for disperse dyeing polyethylene based material having no added polar functionality comprising preparing a primary color dye blend comprising a plurality of disperse dyes from said primary color group, each of the selected plurality of disperse dyes present within the dye blend at a concentration of at least 75 percent but less than 100 percent of its determined maximum concentration which will produce crocking, and contacting the undyed polyethylene material with the disperse dye blend to dye the material.

2. The process of claim 1 wherein the primary color dye blend contains at least three disperse dyes from said primary color group.

3. The process of claim 1 wherein the polyethylene is a polyethylene homopolymer or copolymer of ethylene and a $C_{3-8}$ α-olefin having a melt index (MI) from 0.05 g/10 mm to 50 g/10 mm and density from 0.9 10 g/cm$^3$ to 0.965 g/cm$^3$.

4. The process of claim 3 wherein the polyethylene material is melt spun polyethylene fiber or a woven or nonwoven article produced therefrom.

5. The process of claim 4 wherein the polyethylene is high density polyethylene (HDPE) or linear low density polyethylene (LLDPE) having a MI from 10 to 30 g/10 mm.

6. The process of claim 3 wherein the polyethylene material is flash spun polyethylene plexifilament or a nonwoven article produced therefrom.

7. The process of claim 6 wherein the polyethylene is HDPE or LLDPE having a MI from 0.05 to 10 g/10 min.

8. The process of claim 7 wherein the polyethylene is HDPE having a MI from 0.2 to 5 g/10 min.

9. The process of claim 2 wherein the disperse blue dye blend comprises disperse blue 60, disperse blue 87, disperse blue 148 and disperse blue 291.

10. The process of claim 2 wherein the disperse dyes are each from a red primary color group and are selected from the group consisting of disperse red 60, disperse red 50, disperse red 13, disperse red 127, disperse red 146, disperse red 302, disperse red 65 and disperse red 86.

11. The process of claim 10 wherein the disperse red dye blend comprises 12 to 16% disperse red 50, 9 to 12% disperse red 127, 37.5 to 50% disperse red 146, 7.5 to 10% disperse red 302, 7.5 to 10% disperse red 338 and 7.5 to 10% disperse red 167.

12. The process of claim 2 wherein the disperse dyes are each from a red primary color group and are selected from the group consisting of disperse red 50, disperse red 127, disperse red 146, disperse red 302, disperse red 338 and disperse red 167.

13. The process of claim 12 wherein the disperse red dye blend comprises 12 to 16% disperse red 50, 9 to 12% disperse red 27, 37.5 to 50% disperse red 146, 7.5 to 10% disperse red 302, 7.5 to 10% disperse red 338 and 7.5 to 10% disperse red 167.

14. The process of claim 2 wherein the disperse dyes are each from a yellow primary color group and are selected from the group consisting of disperse yellow 64, disperse yellow 23, disperse brown 19 and disperse orange 37.

15. The process of claim 14 wherein the disperse yellow dye blend comprises 22.5 to 30 percent disperse yellow 64, 22.5 to 50% disperse yellow 23, 22.5 to 30% disperse brown 19 and 6 to 8% disperse orange 37.

* * * * *